No. 757,739. PATENTED APR. 19, 1904.
E. HAINES.
HORTICULTURAL IMPLEMENT.
APPLICATION FILED JUNE 22, 1903.
NO MODEL.
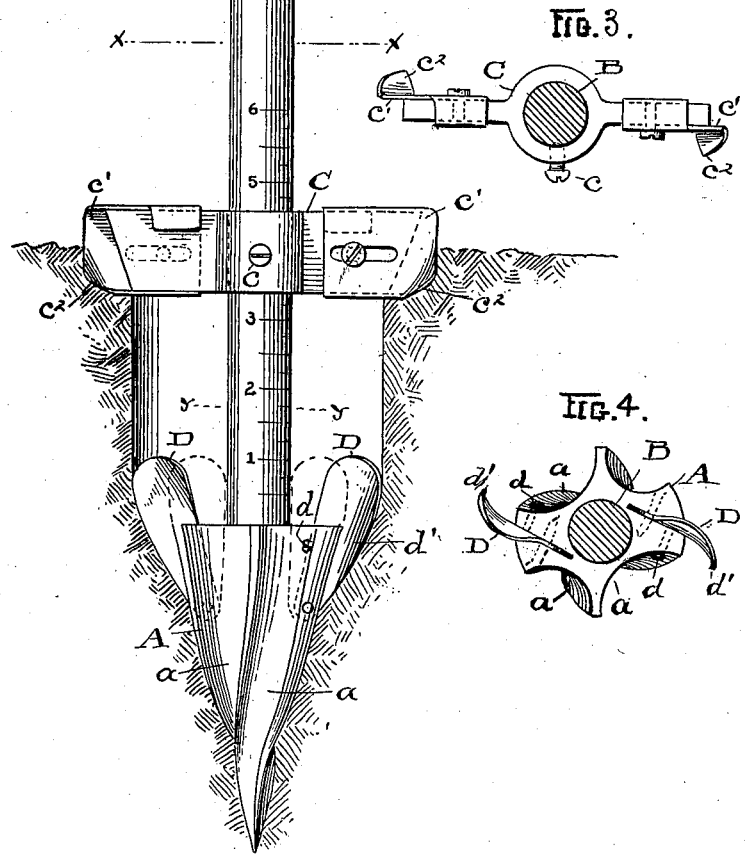
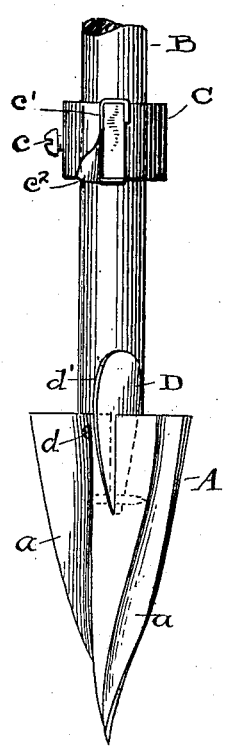
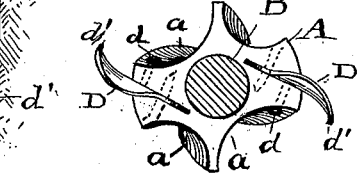
ATTEST
R. B. Moser
R. Jbornik
INVENTOR.
Enoch Haines
By H. J. Fisher
Atty No. 757,739. Patented April 19, 1904.

UNITED STATES PATENT OFFICE.

ENOCH HAINES, OF LAKEWOOD, OHIO.

HORTICULTURAL IMPLEMENT.

SPECIFICATION forming part of Letters Patent No. 757,739, dated April 19, 1904.

Application filed June 22, 1903. Serial No. 162,536. (No model.)

*To all whom it may concern:*

Be it known that I, ENOCH HAINES, a citizen of the United States, residing in the village of Lakewood, in the county of Cuyahoga and State of Ohio, have invented certain new and useful Improvements in Horticultural Implements; and I do declare that the following is a full, clear, and exact description of the invention, which will enable others skilled in the art to which it appertains to make and use the same.

My invention relates to horticultural implements; and the object of the invention is to provide an implement for boring holes about plants, shrubs, and trees for the purpose of feeding or fertilizing the same, all substantially as shown and described, and particularly pointed out in the claims.

In the accompanying drawings, Figure 1 is a plain elevation of the implement or tool represented as being driven into the ground a distance and showing the earth in which the hole is made. Fig. 2 is a plain elevation of the tool with its handle broken off and at right angles to Fig. 1. Fig. 3 is a cross-section on line $x\, x$, Fig. 1; and Fig. 4 is a cross-section on line $y\, y$, Fig. 1.

As represented, the tool comprises a head A, a standard or handle B, permanently fixed upon or in the head, and an adjustable sweep C on said handle. The head A is of cone shape in elevation, running to a point, and formed or provided with spiral vanes or threads $a$, resembling in this particular an auger and adapted to bore a hole in the earth much as an earth-auger would do. This head may be either cast in a single piece or be made up from two or more pieces, as shall be found desirable or convenient. The head itself may be a plain solid part provided with spiral sheet-metal vanes or blades affixed thereto. This would lighten the tool. At opposite points at the top and side of the head and in prolongation or extension of the vanes I secure wings D, which are set into slots tangentially to the axis of the head.

The sweep C is a stiff member sleeved upon the handle or standard B and adjustably fixed thereon by set-screw $c$, according to which the bore of the auger shall extend. In Fig. 1 the depth may be described as nearly at its maximum, because ordinarily one would not want to go to greater depth for this class of work, and the arms of the said sweep are provided each with an outwardly-adjustable share or cutter $c'$, adapted to cut an enlarged ring-shaped opening about the top of the bore or hole made by the auger and curved to turn the earth away. Said shares have cutting edges $c^2$, front and bottom.

Assuming that the boring is done about a tree where there is sod and grass and that a liquid food or fertilizer is to be furnished the tree through one or more openings of this kind, it is desirable to have the sod cut away about the top of the opening some distance back from the wall of the opening and at some depth, so that the opening may be readily found and filled again as the season advances and as the tree may require, and the enlargement made by the sweep prevents the hole from being grown over with grass from the adjacent sod and enlarges the opening for the liquid. It will thus be seen that these holes or openings in the earth are designed to be of a somewhat permanent nature and that they are to be used more or less frequently during the summer season. It will be noticed also that the top of head A has comparatively broad surfaces, so that it is practical when a quantity of earth has been carried up to about its top to move the same from the hole by drawing the tool out quickly and then inserting it again. This repeated a few times will clear the hole of free earth. When completed, the hole or opening is used to apply the food or fertilizer, which may be in a solid or a liquid form and which is especially prepared for different trees and shrubs and plants, according to their nature and needs, and I find this a very effective way also of applying certain disinfectants. If solids be introduced, I may depend on the rains for their distribution or apply liquid for that purpose.

I have shown the standard as provided with a scale running from "1" to "6," indicating inches, so that one may plan for the depth the bore is to go and set the sweep accordingly before introducing the tool.

What I claim is—

1. An earth-auger having a pointed head and vanes running spirally from point to top, and wings at its top set directly into the space between said vanes, in combination with a sweep adjustably secured to the standard above said vanes, substantially as described.

2. An earth-auger comprising a head with spiral vanes, and wings set into slots oppositely in the top of said head, in combination with a sweep adjustably fixed to the handle thereof, and adjustable shares on the ends of the sweep having cutting edges and turned surfaces, substantially as described.

In testimony whereof I sign this specification in the presence of two witnesses.

ENOCH HAINES.

Witnesses:
 E. R. LIEBLEIN,
 K. F. EDWARDS.